United States Patent
Girardeau et al.

(10) Patent No.: US 9,666,083 B2
(45) Date of Patent: May 30, 2017

(54) METHOD FOR INSERTING A SEGMENT OF FLIGHT PLAN IN A FLIGHT PLAN

(71) Applicant: THALES, Courbevoie (FR)

(72) Inventors: Vincent Girardeau, Toulouse (FR); Marie Rommel, Plaisance du Touch (FR); Manuel Gutierrez-Castaneda, Toulouse (FR)

(73) Assignee: THALES, Courbevoie (FR)

(*) Notice: Subject to any disclaimer, the term of this patent is extended or adjusted under 35 U.S.C. 154(b) by 153 days.

(21) Appl. No.: 14/795,199

(22) Filed: Jul. 9, 2015

(65) Prior Publication Data
US 2016/0012733 A1   Jan. 14, 2016

(30) Foreign Application Priority Data
Jul. 11, 2014 (FR) ...................... 14 01560

(51) Int. Cl.
*G08G 5/00* (2006.01)
*G05D 1/00* (2006.01)

(52) U.S. Cl.
CPC ......... *G08G 5/0039* (2013.01); *G05D 1/0088* (2013.01); *G08G 5/0047* (2013.01)

(58) Field of Classification Search
CPC ... G08G 5/0039; G08G 5/0047; G05D 1/0088
See application file for complete search history.

(56) References Cited

U.S. PATENT DOCUMENTS

2008/0059058 A1   3/2008   Caillaud et al.
2014/0012500 A1   1/2014   Savarit et al.

FOREIGN PATENT DOCUMENTS

FR   2 905 480 A1   3/2008
FR   2 921 152 A1   3/2009
(Continued)

*Primary Examiner* — Basil T Jos
(74) *Attorney, Agent, or Firm* — Baker & Hostetler LLP (57) ABSTRACT

The invention relates to a method for inserting a segment (Tins) of flight plan into an initial flight plan (Pini) of an aircraft, performed by a flight management system (FMS) of the said aircraft,
the initial flight plan (Pini) comprising an ordered series of initial legs (Sini), the said fixed initial legs being indexed with an index i that varies from 1 to n, the method comprising the steps involving:
identifying (110), using a first iterative calculation on the index i, in the segment to be inserted (Tins), the fixed legs to be inserted that have a position identical to the position of the leg of index i Sini(i)),
the said legs thus determined being referred to as occurrences of the leg of index i, the said occurrences (O1, O2) being ordered by rank k varying from 1 to m, as a function of their position in the segment that is to be inserted (Tins), and searching, among the identified occurrences, for the occurrence of lowest index i and lowest rank k ($O_{i0}(k_0)$) that has a type and attribute values identical to the segment of index i, referred to as equivalent point,
when the said equivalent point exists, inserting the segment that is to be inserted (Tins) from the said equivalent point,
otherwise, inserting the segment that is to be inserted (Tins) from the identified occurrence of lowest index i and lowest rank k ($O_{i1}(k_1)$) referred to as a pseudo equivalent point, when the said pseudo equivalent point exists.

12 Claims, 9 Drawing Sheets

(56) References Cited

FOREIGN PATENT DOCUMENTS

| | | |
|---|---|---|
| FR | 2 941 794 A1 | 8/2010 |
| FR | 2 993 064 A1 | 1/2014 |
| WO | 02/29363 A2 | 4/2002 |

METHOD FOR INSERTING A SEGMENT OF FLIGHT PLAN IN A FLIGHT PLAN

CROSS-REFERENCE TO RELATED APPLICATION

This application claims priority to foreign French patent application No. FR 1401560, filed on Jul. 11, 2014, the disclosure of which is incorporated by reference in its entirety.

FIELD OF THE INVENTION

The present invention relates to a method for inserting a segment of flight plan in an initial flight plan. It applies notably to the field of avionics, and more particularly to the flight management devices more usually known by their acronym FMS which stands for Flight Management System.

BACKGROUND

Figure 1:
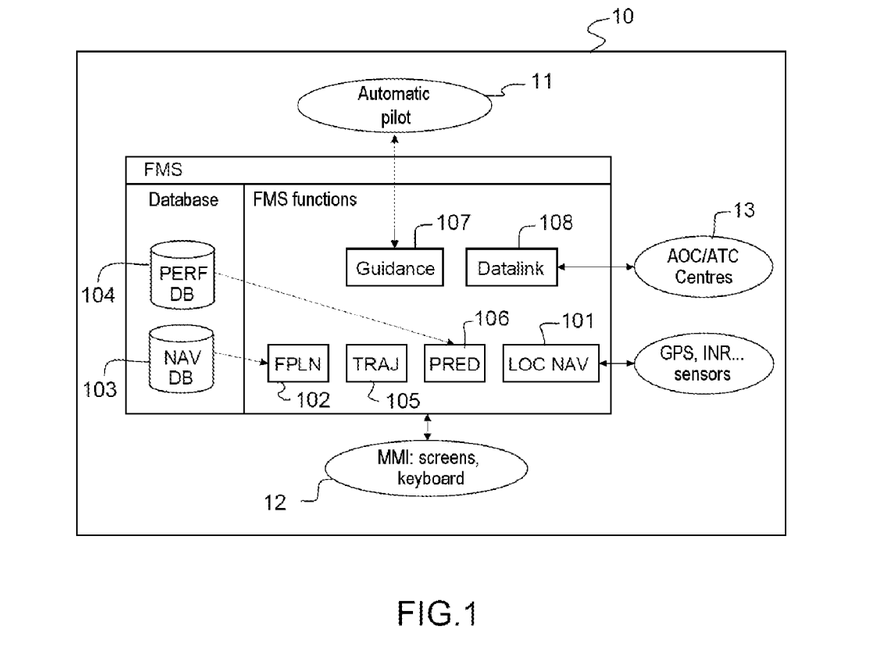
FIG. 1 already mentioned depicts the various components of a flight management system according to the prior art.

A flight plan is a detailed description of the route that an aircraft is to follow as part of a planned flight. The flight plan is currently managed onboard civilian aircraft by a system referred to as a flight management system, which will be referred to hereinafter as FMS and which makes the course that is to be followed available to the flight crew and other on-board systems. These systems amongst other things provide navigation aid by displaying useful information to the pilots, or by communicating flight parameters to an automatic pilot system. FIG. 1 shows a block diagram illustrating the structure of a known FMS of the prior art. An FMS-type system 10 has a man-machine interface 12 comprising, for example, a keyboard and a display screen, or quite simply a touch-sensitive display screen, as well as at least the following functions which are described in the ARINC 702 standard:

Navigation (LOCNAV) 101, for optimally locating the aircraft using geographic-location means 130 such as satellite navigation or GPS, GALILEO, VHF radio navigation beacons and inertial units. This module communicates with the aforementioned geographical-location devices;

Flight plan (FPLN) 102, for the acquisition of the geographical elements that make up the framework of the course to be followed, such as the fixes imposed by the departure and arrival procedures, waypoints, or aerial corridors more commonly referred to as airways;

Navigation database (NAVDB) 103, to build the geographical courses and procedures from data included in databases relating to the fixes, beacons, intercept or altitude legs, etc;

Performance database (PRFDB) 104, containing aerodynamic and engine parameters relating to the craft;

Lateral trajectory (TRAJ) 105, for constructing a continuous trajectory from the points in the flight plan, consistent with the performance of the aircraft and complying with accuracy requirements (RNP);

Predictions (PRED) 106, to construct a vertical profile that is optimized on the lateral and vertical trajectory. The functions that form the subject matter of the present invention affect this part of the computer;

Guidance (GUID) 107, for guiding the aircraft on its three-dimensional trajectory in the lateral and vertical planes while at the same time optimizing aircraft speed.

In an aircraft equipped with an automatic pilot device 11, the latter can exchange information with the guidance module 107;

Digital data link (DATALINK) 108 for communicating with the control centres and other aircraft 13.

The flight plan is input by the pilot, or alternatively via a data link, from data contained in the navigation database.

The pilot then inputs the aircraft parameters: mass, flight plan, range of cruising altitudes, and one or a plurality of optimization criteria such as the CI. These inputs allow the TRAJ module 105 and PRED module 106 respectively to calculate the lateral trajectory and the vertical profile, i.e. the flight profile in terms of altitude and speed, which for example minimizes the optimization criterion.

The flight plan managed by the FMS is coded in a specific way in the form of a series of legs which are defined by an aeronautical standard. In commercial aviation, the international standard ARINC 424 defines various types of legs. The standard uses the widely-understood English terminology "legs".

The legs in the ARINC 424 standard are described in greater detail hereinbelow. A flight plan is made up of an ordered series of legs, a leg corresponding to an instruction for the FMS to follow in order to calculate the trajectory of the aircraft. Each leg generates a trajectory portion or elementary trajectory. This elementary trajectory corresponds to a geometric element that may be a straight-line segment, an arc or combinations of straight-line and arc segments, but the term "segment" must not in any way be interpreted here in its geometric sense. The lateral trajectory is calculated from one leg to another in accordance with a certain number of conventions.

A flight plan is produced by stringing together, amongst other things, procedures that are stored in the navigation database 130 and structured in accordance with the aforementioned standard ARINC 424. These procedures, made up of a set of legs, come from data supplied by the countries concerned, corresponding to the points and procedures in force in the airspace being crossed. For example, in order to construct a flight plan, the pilot chooses various procedures indexed by a name. The FMS then extracts these procedures from the navigation database then strings the successive procedures together (the English expression "stringing" is commonplace) to generate the flight plan. The method of stringing according to the prior art is described later on.

The aeronautical standard ARINC 424 defines a set of leg types, each type having its own characteristics referred to as attributes corresponding to a type of data needed for calculating the elementary trajectory corresponding to the type, for example instructions to be followed in terms of position, altitude, heading or course.

The international standard ARINC 424 defines a set of 23 leg types. The standard ARINC 424 also defines all of the combinations in which these legs can be strung together, notably excluding certain sequences. The legs currently defined in the ARINC 424 standard are listed in the table below.

Thus, the ARINC 424 standard defines:

8 types of legs known as fixed legs, the start or termination of which is a fixed waypoint on land, published in terms of latitude and longitude (a navigation fix or "waypoint" usually denoted by the abbreviation WPT). These are legs of the IF, CF, DF, TF, AF, RF, FC, FD type.

11 types of legs referred to as "floating" legs, the termination of which consists in the achievement of a variable condition, such as, for example, legs which terminate when the aircraft has reached a certain altitude. These are legs of the VA, CA, FA, VI, CI, VD, CD, VR, CR, VM, FM type. Certain floating legs, FA, FM, CD and CR may, however, use a fixed waypoint.

3 types of leg referred to as "holding legs" which correspond to racetrack circuits. These are the legs of the HM, HA, HF type.

one type of leg referred to as "course reversal" which corresponds to a procedure turn away from and then back towards the trajectory. These are legs of the PI type.

Note that the fix attribute is used differently for calculating the elementary trajectory depending on the type of leg.

For example, a leg of CF (course to a fix) type is a leg the termination of which is a fix (waypoint) and of which the bearing with respect to north is specified: thus, the trajectory is calculated in order to intercept the termination point along a specific axis corresponding to the bearing.

In another example, a leg of FA (fix to an altitude) type is a leg the starting point of which is a fix (waypoint) and the termination of which is the attaining of a specified altitude

| Type | ARINC 424 Name | Meaning |
|---|---|---|
| IF | Initial Fix | Initial fixed point on the ground |
| CF | Course To a Fix | Go to/follow a course to a fixed point (fix) |
| DF | Direct to a Fix | Go directly (in a straight line) to a fix |
| TF | Track between two Fixes | Follow a great circle route between 2 fixes |
| AF | Arc DME to a Fix | Defines an arc of a circle about a DME beacon at a specified distance with a limit on angle. |
| RF | Radius to a Fix | Defines an arc of a circle between 2 fixed points (the 1$^{st}$ point being the fix of the pervious leg), on a centre fix. |
| VI | Heading to Intercept | Defines a heading to intercept the next leg |
| CI | Course to Intercept | Defines a course to intercept the next leg |
| VA | Heading to Altitude | Defines a heading to be followed until a specific altitude is reached |
| CA | Course to Altitude | Defines a course to be followed to a specific altitude |
| FA | Fix to Altitude | Defines a course to be followed, from a fix to a specified altitude |
| VD | Heading to DME Distance | Defines a heading to be followed to intercept a specified DME arc |
| CD | Course to DME Distance | Defines a course to be followed to intercept a specified DME arc |
| VR | Heading to Radial | Defines a heading to be followed to intercept a specified radial |
| CR | Course to Radial | Defines a course to be followed to intercept a specified radial |
| FC | Track from Fix to Distance | Defines a course to be followed from a fix for a specified distance |
| FD | Track from Fix to DME Distance | Defines a course to be followed from a fix to intercept a DME arc (specified DME distance) |
| VM | Heading to Manual | Defines a heading without a termination (infinite half straight line) |
| FM | Fix to Manual | Defines a route, from a fix, without a termination (infinite half straight line) |
| HA | Hippodrome to Altitude Termination | Racetrack circuit, with hold to an altitude |
| HF | Hippodrome to Fix Termination | Racetrack circuit with one single turn |
| HM | Hippodrome to Manual Termination | Manually terminated racetrack circuit, no exit condition |
| PI | Fix to Manual | Procedure turn defined by a route away from the fix, followed by a one hundred and eighty-degree course reversal to intercept the initial outbound course for the return. |

ARINC 424 Legs

For certain stringing calculations, the FMS in fact uses only 19 types rather than 23 as 4 types can be broken down into a combination of other types. These are the types FC and FD which are converted into type CF, and the types CI and VI which are converted into CR/VR or CD/VD.

Thus, the 19 types adopted are: IF, CF, DF, TF, AF, RF, VA, CA, FA, VD, CD, VR, CR, VM, FM, HM, HA, HF, PI.

Of this set of 19 types, a subset of 16 types groups the types that have an attribute, referred to as fix, corresponding to a navigational fix or waypoint WPT.

This subset SEF is made up of all of the types referred to as "fixes" IF, CF, DF, TF, RF, AF, of all the "holding procedure" types HA, HF and HM, of the type PI, and of certain types of floating leg: VD,VR, FA, FM, CD,CR.

Thus only the floating legs of type CA, VA and VM have no "fix" attribute.

In the remainder of the description we will refer to as a fixed leg any leg the type of which belongs to the SEF subset, namely any leg the type of which comprises a fix attribute, namely a waypoint WPT that we shall refer to as an associated position, defined by a latitude and a longitude.

in the leg, along a lateral route (bearing with respect to north) that is specified in the leg. Thus, the calculated trajectory starts at the fix, follows the specified line of the route and does so until the specified leg-end altitude is reached.

Under certain operational conditions, the pilot finds himself needing to modify the initial flight plan Pini, for example the current flight plan that he is in the process of flying, or a flight plan initially intended when the aircraft was on the ground.

During tactical operations for example, the pilot may find himself needing to modify a search and rescue procedure known by the acronym SAR, made up of a string of particular legs (parallel-track search pattern for example) in order to switch to another type of SAR procedure, i.e. to another string of legs (expanding square search pattern for example). If the search is being conducted in the same geographical zone then there are generally points that the 2 procedures have in common.

In order to do that, a segment of flight plan Tins needs to be inserted into the initial flight plan Pini to replace part of the initial plan or supplement the latter, so as to form a modified flight plan Pm. This segment Tins corresponds for example to a takeoff or landing procedure, a tactical procedure (such as search and rescue), a low-altitude flight procedure or a procedure for avoiding danger zones (terrain, weather). Tins is typically a procedure stored in the navigation database.

Insertion of Tins in Pini corresponds to the stringing of the series of legs of Pini together with the series of legs of Tins.

The principle of stringing according to the prior art is described hereinbelow for various examples.

Figure 2A:
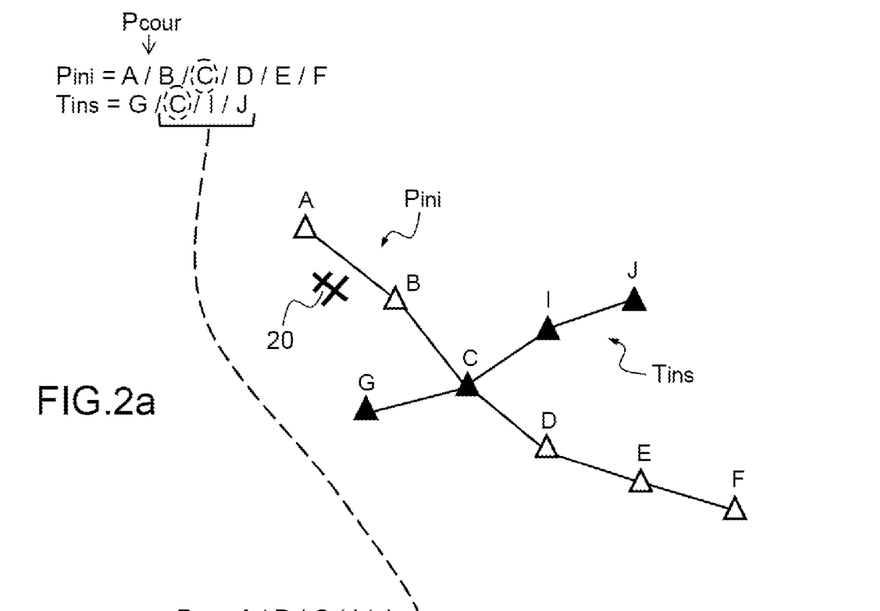
FIGS. 2a-2c already mentioned illustrate the method of inserting a segment using an FMS according to the prior art.
Figure 2B:
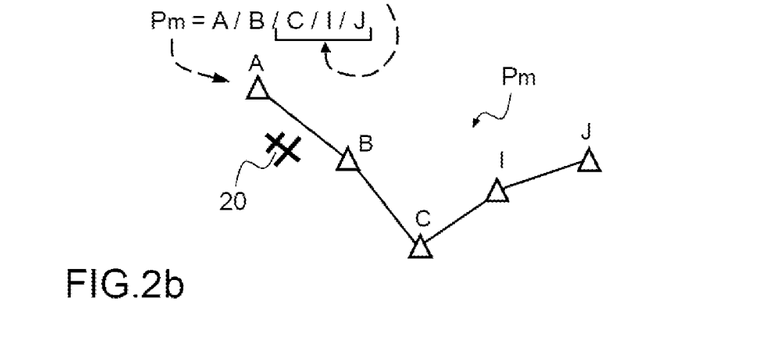
Figure 2C:
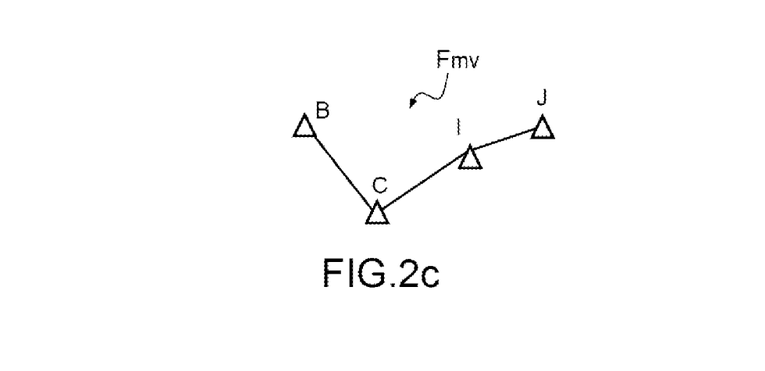

A first example of insertion according to the prior art is illustrated in FIGS. 2a-2c.

The initial flight plan Pini is defined by a succession of legs, which we will simplify as a succession of waypoints, which amounts to considering only the fixed legs (see FIG. 2a). Thus, in what follows, a point or fix means a leg.

$Pini=A/B/C/D/E/F$

The aircraft 20 is in the process of flying the trajectory associated with this flight plan and its current position Pcour is between the point/leg A and the point/leg B.

The segment of flight plan to be inserted Tins is defined by:

$Tins=G/C/I/J$

The desire is therefore to insert Tins in Pini.

To do that, an FMS according to the prior art considers one by one the fixed legs of the flight plan Pini from the leg that comes downstream of the current position of the aircraft, in the example here, B, C, D, E and F, and compares the waypoint associated with the fixed leg of Pini with the waypoints associated with fixed legs of the segment that is to be inserted Tins.

In the example, consideration is given first of all to $WPT_B$ associated with B, and Tins is searched to see whether there is a fixed leg which as its associated position has the position $WPT_B$. If there is none, the search moves on to C in Pini, which has the associated position $WPT_C$. Tins is searched, in the order of the legs, to see whether there is a fixed leg having as its associated position $WPT_C$. As soon as the FMS has identified a fixed leg of Tins the position attribute of which is identical to the fixed leg of Pini being considered, in this case C in the example of FIGS. 2a-2c, the segment Tins is inserted in Pini from C and replaces the subsequent legs of Pini with the segments of Tins from C onwards (see FIG. 2b), this being referred to as the join point:
Fraction of Tins to be inserted: C/I/J
Modified flight plan Pm generated after insertion:

$Pm=A/B/C/I/J$

Accounting for the current position of the aircraft between A and B, the fraction of Pm still to be flown Fmv is (see FIG. 2c):

$Fmv=B/C/I/J$

One operational illustration is a standard arrival procedure, referred to as STAR, which comprises legs A,B,C,D, E,F and which is followed by an intermediate approach procedure referred to as VIA comprising the points G, C, I, J. The operation of stringing STAR with VIA (or inserting VIA in STAR) will give rise to a flight plan comprising legs A, B, C, I, J. The point "C" that is common to the two procedures (the same position) is considered to be the join point.

A second example of insertion is a change of runway for an aircraft approaching an airport. The terminal part of the initial flight plan (landing procedure) terminating on the initially intended runway has then to be replaced by a new terminal part terminating on the new runway.

In order to identify the fixed leg that needs to be replaced, in this instance C, the FMS according to the prior art makes a single comparison on the value of the associated position, i.e. compares the latitude and the longitude.

In this situation, the insertion method described previously has disadvantages as illustrated in FIGS. 3a-3c.

Figure 3A:
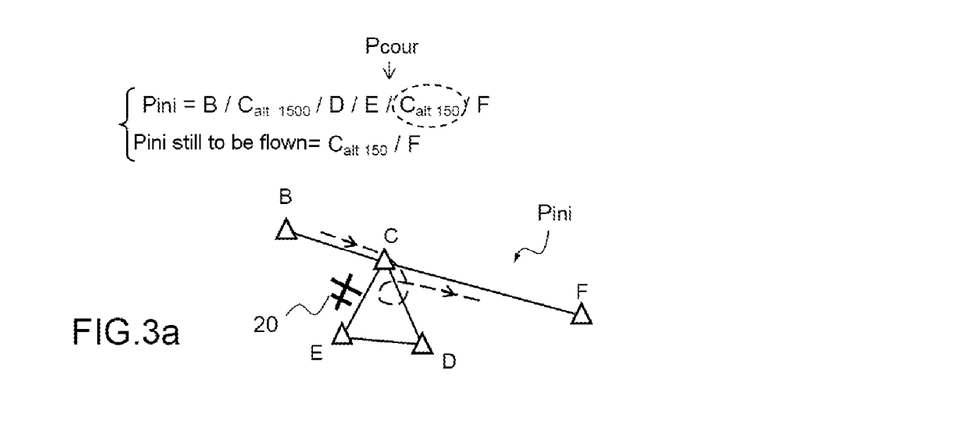
FIGS. 3a-3c already mentioned illustrate a disadvantage of the method of insertion according to the prior art.

The initial flight plan is a terminal procedure terminating on a runway at F (see FIG. 3a):

$Pini=B/C_{alt1500}/D/E/C_{alt150}/F$

This flight plan Pini comprises a loop which passes repeatedly through the point C, but at two different altitudes, first at 1500 m then at 150 m.

Let us suppose that the current position of the aircraft 20 Pcour is between E and C, and that the aircraft is in the process of completing the loop. The fraction of Pini that remains to be flown is $C_{alt150}/F$.

Figure 3B:
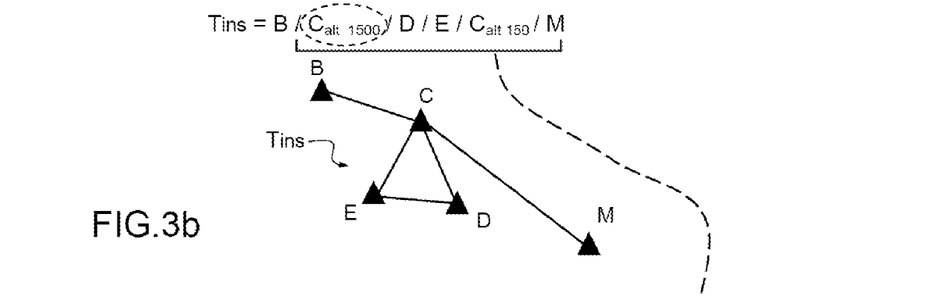

At this moment the pilot receives orders from air traffic control to land in another trajectory terminating at M, corresponding to another runway. The FMS searches the database for the corresponding landing procedure Tins (see FIG. 3b):

$Tins=B/C_{alt1500}/D/E/C_{alt150}/M$

Figure 3C:
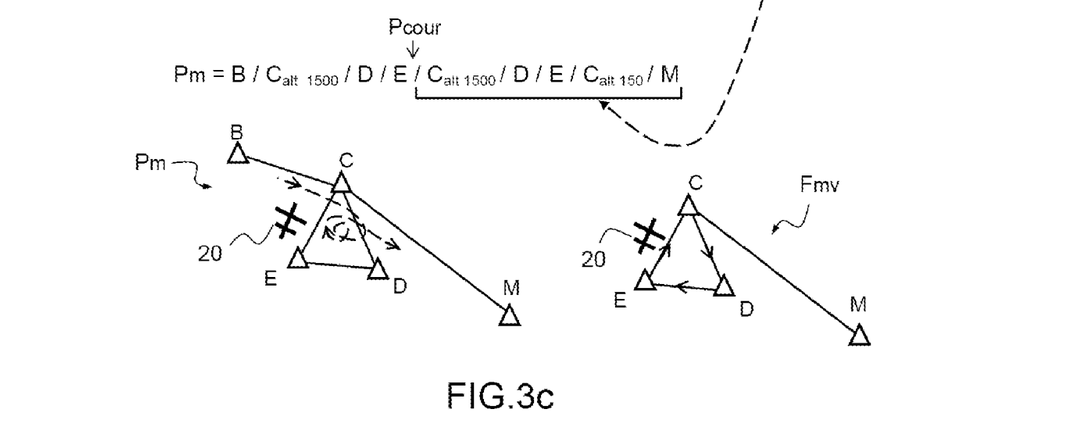

By applying the method described hereinabove, the FMS inserts the procedure Tins from the first point of Tins that has an associated position $WPT_C$.
The fraction of Tins inserted is: $C_{alt1500}/D/E/C_{alt150}/M$
The new procedure Pm generated is therefore (see FIG. 3c):

$Pm=B/C_{alt1500}/D/E/C_{alt150}/M.$

Accounting for the current position of the aircraft between E and C, the fraction of Pm still to be flown Fmv is equal to:

$Fmv=C_{alt1500}/D/E/C_{alt150}/M.$

It may be seen that the aircraft 20 will needlessly repeat a loop.

Thus the late change in runway leads to a needless manoeuvre, which does not correspond to the instructions from air traffic control, consumes fuel, and is carried out in a space cluttered with other aircraft. In order to avoid such a disadvantage, the pilot has to make a manual intervention and delete the unneeded legs, something which takes up precious time during the tricky landing phase.

Figure 4A:
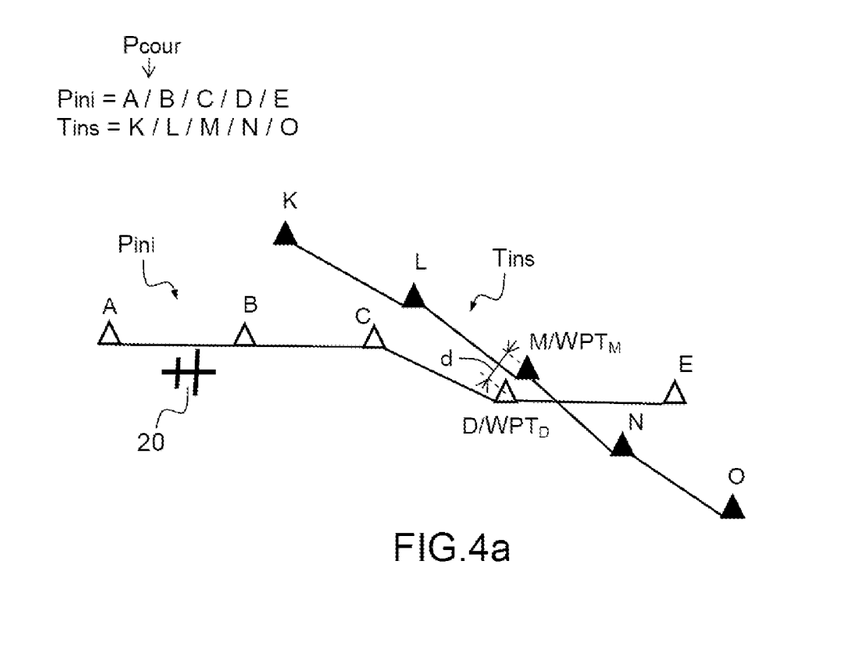
FIGS. 4a-4b already mentioned illustrate another disadvantage of the method of insertion according to the prior art.
Figure 4B:
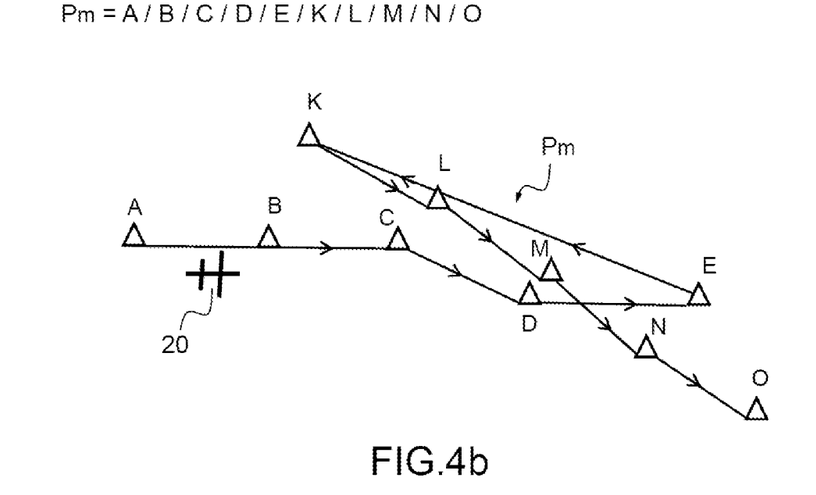

Another disadvantage with the previous method of insertion is illustrated in FIGS. 4a-4b.

The desire is to insert the segment Tins=K/L/M/N/O into a flight plan Pini=A/B/C/D/E (see FIG. 4a).

The position $WPT_M$ associated with M is not identical to the position $WPT_D$ associated with D, but is close, for example $WPT_M$ is situated a distance d of less than 1 km away from $WPT_D$.

The method according to the prior art described hereinabove makes an exact comparison and, finding that Pini and Tins have no point in common, the FMS inserts Tins at the end of Pini, namely after the last leg of Pini.

The modified procedure obtained is (see FIG. 4b):

$Pm=A/B/C/D/E/K/L/M/N/O$

The aircraft governed by the FMS will fly the entirety of the corresponding trajectory unless the pilot intervenes manually to modify Pm. This trajectory does not correspond to what air traffic control is expecting and will cause air traffic control to have to take the aircraft back in hand in order to avoid the risk of collisions with other aircraft moving around in this same space. Furthermore, this trajectory which uses up fuel will cause the pilot some degree of stress as his instruction is to economize on fuel.

It is an object of the invention to alleviate the aforementioned disadvantages by proposing a method for determining a modified flight plan from an initial flight plan that an aircraft can fly and from a segment that is to be inserted that makes it possible to obtain a modified flight plan without unnecessary duplications.

SUMMARY OF THE INVENTION

In a first aspect, a subject of the present invention is a method for inserting a segment of flight plan into an initial flight plan of an aircraft, performed by a flight management system (FMS) of the said aircraft,
  the initial flight plan comprising an ordered series of initial legs, the segment to be inserted comprising an ordered series of legs to be inserted,
  a leg corresponding to an instruction for calculating an elementary trajectory and being defined by an aeronautical standard that defines a set of leg types, each type being characterized by at least one attribute corresponding to a type of data item needed for calculating the said elementary trajectory,
  a subset of the said set of types having an attribute corresponding to a position defined by geographical latitude and longitudinal coordinates, a leg the type of which belongs to the said subset being referred to as a fixed leg and having an associated position, the said initial fixed legs being indexed by an index i that varies from 1 to n, the method comprising the steps involving:
    identifying, using a first iterative calculation on the index i, in the segment to be inserted, the fixed legs to be inserted that have a position identical to the position of the leg of index i,
the said legs thus determined being referred to as occurrences of the leg of index i, the said occurrences being ordered by rank k varying from 1 to m, as a function of their position in the segment that is to be inserted, and
searching, among the identified occurrences, for the occurrence of lower index i and lowest rank k that has a type and attribute values identical to the segment of index i, referred to as equivalent point,
  when the said equivalent point exists, inserting the segment that is to be inserted from the said equivalent point,
  otherwise, inserting the segment that is to be inserted from the identified occurrence of lower index i and lowest rank k referred to as a pseudo equivalent point, when the said pseudo equivalent point exists.

For preference, the first iterative calculation stops as soon as the equivalent point is identified.

For preference, the pseudo equivalent point and the associated fixed initial leg are stored in memory while the first iterative calculation is being run.

According to one preferred embodiment, the aeronautical standard is the standard ARINC 424.

According to one preferred embodiment, the set of types comprises 19 types of leg:
initial fix fixed on the ground; course to a fix; direct to a fix; track to a fix between two fixes on a great circle; arc to a fix about a DME beacon; radius to a fix in a constant-radius turn between two fixes; fix to an altitude following a course from a fix to a specified altitude; fix to a manual termination from a fixed point until manually terminated; course to an altitude following a course to a specified altitude; course to a specified DME distance; course to a radial termination; heading to a specified altitude; heading to a DME distance termination; heading to a manual termination; heading to a radial termination; procedure turn following a course starting from a fix then making a one hundred and eighty degree turn; racetrack course with hold to an altitude; racetrack course with a single turn holding to a fix; manual racetrack course holding to a manual termination.

According to one preferred embodiment, the said subset of types comprises 16 types of fixed leg:
initial fix fixed on the ground; course to a fix; direct to a fix; track to a fix between two fixes on a great circle; arc to a fix about a DME beacon; radius to a fix in a constant-radius turn between two fixes; fix to an altitude following a course from a fix to a specified altitude; fix to a manual termination from a fixed point until manually terminated; course to a specified DME distance; course to a radial termination; heading to a DME distance termination; heading to a radial termination; procedure turn following a course starting from a fix then making a one hundred and eighty degree turn; racetrack course with hold to an altitude; racetrack course with a single turn holding to a fix; manual racetrack course holding to a manual termination.

According to one alternative implementation, one or more attribute(s) are chosen from a list comprising: a turn direction, a heading, an altitude, a distance, a radial, a maximum excursion in terms of time or in terms of distance.

According to a first embodiment, when the pseudo point does not exist, the segment to be inserted is inserted in the initial flight plan after the last initial leg.

According to a second embodiment, when the pseudo point does not exist, the method 100 according to the invention further comprises a step consisting in:
  identifying using a second iterative calculation on the index i, in the segment that is to be inserted, a fixed leg that is to be inserted that is of lower index i and lowest rank k having a position situated at a distance from the position of the leg of index i that is less than a predefined distance and referred to as a close leg,
  if the said close leg exists, inserting the segment that is to be inserted from the close leg,
if the close leg does not exist, inserting the segment that is to be inserted in the initial flight plan after the last initial leg.

BRIEF DESCRIPTION OF THE DRAWINGS

Further features, objects and advantages of the present invention will become apparent from reading the detailed description which will follow and from studying the attached drawings given by way of nonlimiting examples and in which.

DETAILED DESCRIPTION

Figure 5:
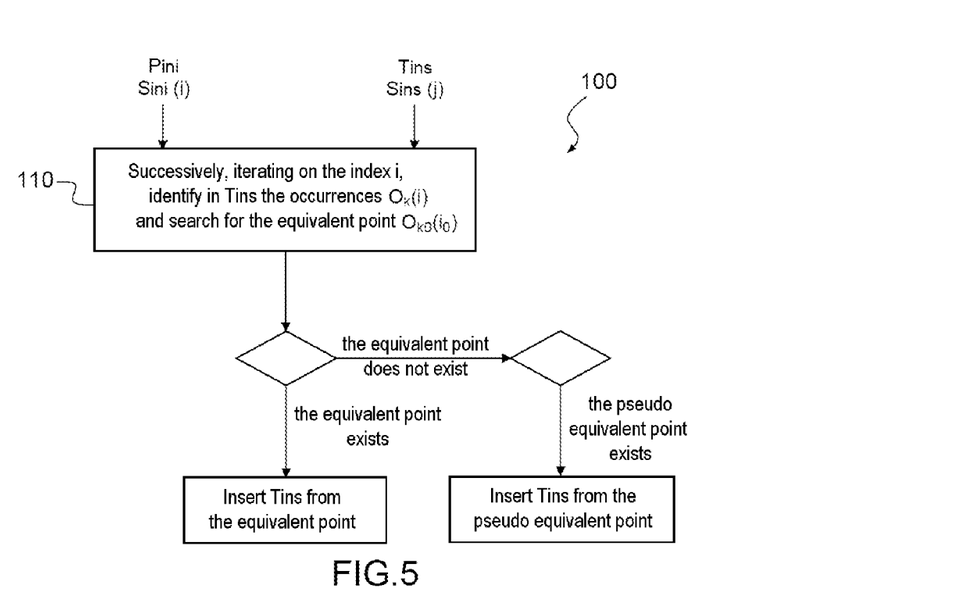
FIG. 5 illustrates a method according to the invention.

FIG. 5 illustrates the method 100 according to the invention for inserting a segment Tins of flight plan into an initial flight plan Pini of an aircraft. The method according to the invention is implemented by the flight management system (FMS) of the aircraft.

The initial flight plan Pini comprises an ordered series of initial legs Sini(i), with i varying from 1 to n, and the segment that is to be inserted Tins also comprises an ordered series of legs that are to be inserted Sins(j), with j varying from 1 to m.

A leg corresponds to an instruction to calculate an elementary trajectory and is defined by an aeronautical standard that defines a set of leg types, each type being characterized by at least one attribute corresponding to a type of data needed for calculating the elementary trajectory.

For preference, the aeronautical standard is the international standard ARINC 424 which applies to commercial navigation.

Of the various types, a subset SEF of the set of types has an attribute that we shall refer to as fix, corresponding to a position WPT, namely to a navigation fix defined by geographical coordinates of latitude and longitude. In order to define unambiguously the elementary trajectory corresponding to a leg it is in fact often necessary to use a fixed point in space which is listed in the navigation database 103 or input by the pilot.

A leg the type of which belongs to the subset SEF is referred to as fixed leg, and to each fixed leg there corresponds an associated position.

The fixed initial legs of Pini are suffixed by an index i, i varying from 1 to n.

The method 100 according to the invention comprises a step 110 which consists on the one hand in identifying, using a first iterative calculation on the index i, in the segment that is to be inserted Tins, the fixed legs that are to be inserted that have a position identical to the position of the leg of index i, Sini(i).

The segments of Tins thus determined are referred to as occurrences of the leg of index i and are ordered Ok(i) by rank k varying from 1 to m, O1(i), O2(i), . . . , according to their position in the segment that is to be inserted Tins.

For example, the leg of index 2 of Pini–Sini(2)—has 2 occurrences, m=2 and the occurrences are O1(2) and O2(2).

On the other hand, the step 110 searches the identified occurrences for the occurrence of lowest rank k that has a type and attribute values that are identical to the leg of index i considered: $O_{i0}(k_0)$. This identified occurrence which has an identical type and identical attributes is referred to as an equivalent point.

Thus, the iterative calculation identifies the occurrences and compares them in terms of type and attribute i by i, starting with Sini(1) then Sini(2).

The equivalent point is the first occurrence encountered during the iterative calculation, that has the lowest index i0 of all the occurrences and, for this index $i_0$, the lowest rank k that has the property of having an identical type and identical attributes. So, if several occurrences $Ok_0$, $Ok_1$, $Ok_2$ of the same type and with identical attribute values exist for the one same index $i_0$, with $k_0 < k_1 < k_2$, it is the occurrence $Ok_0$ of lowest rank k that is chosen.

Next, when the equivalent point $O_{i0}(k_0)$ exists, the method 100 inserts the segment that is to be inserted Tins from the equivalent point.

Once the equivalent point $O_{i0}(k_0)$ and the associated leg Sini($i_0$) have been identified, the insertion of Tins takes place in the conventional way, as explained in the prior art: the part of Tins from $O_{i0}(k_0)$ onwards inclusive replaces the part of Pini from Sini($i_0$) onwards, Sini($i_0$) being replaced by $O_{i0}(k_0)$. Insertion is performed in the conventional way.

If the equivalent point does not exist, the method 100 inserts the segment that is to be inserted Tins from the identified occurrence of lower index i and lowest rank k $O_{i1}(k_1)$ referred to as pseudo equivalent point, if such a pseudo equivalent point exists. The pseudo equivalent point is the first occurrence encountered when running the iterative calculation with no consideration of type or attribute. It corresponds to the occurrence searched for in the prior art.

The pseudo equivalent point is used only if the iterative calculation comes to an end, i.e. up to i=n, without having been able to identify an equivalent point.

For preference, the first occurrence encountered (pseudo equivalent point) is stored in memory while the calculation is being done, as is the corresponding leg Sini, namely the corresponding index in case no equivalent point can be identified.

If an equivalent point is identified later, for an index $i_1$ higher than $i_0$, the pseudo equivalent point is not used.

Table 1 at the end of the document explains, according to one example, the attributes that are to be compared for leg types according to standard ARINC 424.

The fixed legs, of type IF, CF, DF, TF, RF, AF, VD,VR, FA, FM, CD,CR, HA, HF and HM, PI have the attribute Fix as described hereinabove.

The IF leg has just one attribute, Fix, the value of which is the latitude and longitude of the associated waypoint.

The TF leg has two attributes, the Fix attribute and the "turn direction" attribute, which describes the direction in which the aircraft must turn. This attribute may adopt two values, left or right.

The CF leg has three attributes: Fix, Turn Direction and Course; the course attribute corresponds to a heading with which the aircraft must comply and its value is an angle identifying this heading, typically a value in degrees comprised between 0° and 360° and identified with respect to north.

Certain types of leg have other attributes, for example an altitude (values expressed in m or in feet), a distance, a time.

For the CD, CR, VD and VR legs one attribute explains the fact that the leg is or is not derived from a combination of other legs.

For example: procedure IF (point A)/FA (from point A to an altitude of 900 m on a heading of 130°)/CF (heading of 140° towards point B)/CF (heading of 120° towards point C).

Two legs of the same type of necessity have the same attributes and the method compares the values of these attributes with one another and keeps the occurrence found only if all the attributes have values identical to the values of the corresponding attributes of the current leg.

For example:

Pini=Sini(1)=leg A/Sini(2)=leg CF(WPT B, course 100°)/Sini(3)=leg CF(WPT C, course 130°)/leg B Tins=Tins(1)=lex X/Tins(2)=leg CF(WPT B, course 60°)/Tins(3)=leg CF(WPT C, course 130°)/leg Y During the iterative calculation, the method identifies first of all, for i=2, the leg Tins(2) that has the same position WPT B as the leg Sini(2). Tins(2) is the first occurrence that the method encounters and the only occurrence of i=2: Tins(2)=O1(2); Tins(2)=O1(2) is not the equivalent point because the values of the course attribute are different, it is the pseudo equivalent point. Tins(2) is stored in memory as is the value of i=2 and/or the corresponding leg Sini(2). The prior art considers this leg Tins(2) for the insertion.

Then, for i=3, the method 100 according to the invention identifies the leg Tins(3) corresponding to O1(3) which has the same position WPT C as the leg Sini(3) and also the same type and same values of course attribute as Sini(3). The leg Tins(3) is the equivalent point.

The iterative calculation stops and the part of Pini from Sini(3) inclusive is replaced by the part of Tins from Tins(3) inclusive:

$Pm$=leg $A$/Sini(2)=leg $CF$(WPT $B$, course 100°)/Tini (3)=leg $CF$(WPT $C$, course 130°)/leg $Y$ Thus, the occurrence chosen as equivalent point is the one with the lowest rank in i and k which has the following characteristics: position, type, attributes identical to the current initial leg.

It should be noted that in the method 100 according to the invention, the occurrence of the same type but that has different attribute values is not given preference, for insertion, over the pseudo equivalent point that has only the same position. It is a perfect comparison that is being sought, and no priority is given to the degraded cases.

Furthermore, the segment Tins is inserted as such from the equivalent point onwards, which means to say with the fixed and nonfixed legs it contains, respecting the order.

One advantage of the method according to the invention is that when there are at least two occurrences that exist, the implementation of the method allows the FMS to determine the best occurrence, avoiding unnecessary overflying and fuel consumption, thanks to the use of two criteria above and beyond those used in the prior art, namely the type and the attributes.

Figure 6:
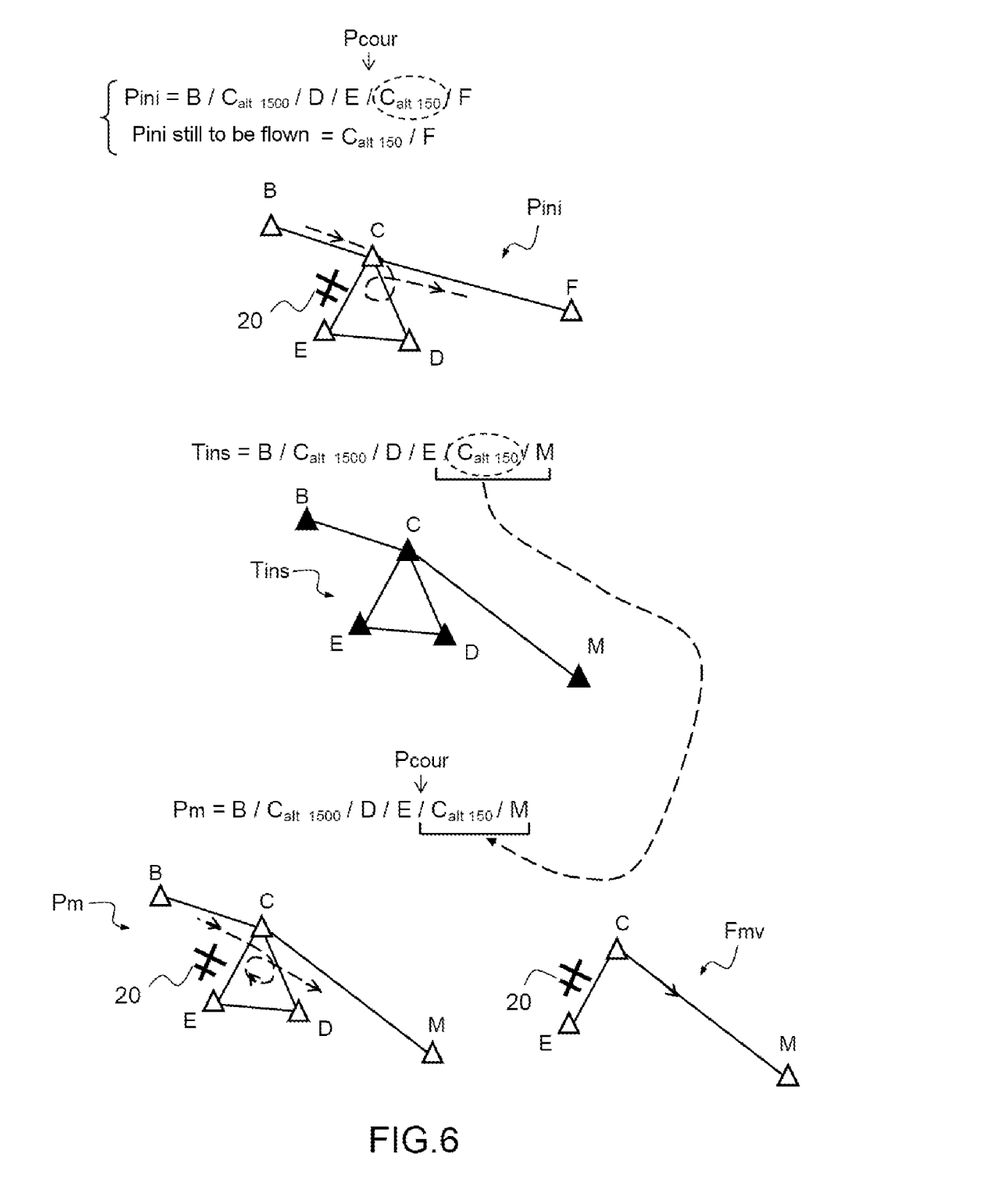
FIG. 6 illustrates an advantage of the method according to the invention to be compared with the disadvantage illustrated in FIGS. 3a-3c.

This advantage is illustrated in FIG. 6 which reconsiders the scenario in FIGS. 3a-3c.

$P\text{ini}=B/C_{alt1500}/D/E/C_{alt150}/F$

Fraction of Pini still to be flown: $C_{alt150}/F$.

$T\text{ins}=B/C_{alt1500}/D/E/C_{alt150}/M$

For the current segment $S_{ini/cour}$=Sini(5) equal to the leg $C_{alt150}$, for example of type FA the altitude of which is an attribute with value 150 m, the step 110 of identifying the occurrences identifies two:
O1(5)=Tins(2)$C_{alt1500}$ and O2(5)=Tins(5)=$C_{alt150}$ assuming that the two legs C of Tins are also of type FA.

A comparison of the attributes, in this instance the altitude, determines $Ok_0(5)$=O2(5). Unlike an FMS according to the prior art, which stops at O1(5), the method allows the more relevant second occurrence O2 to be selected. Thus, Tins is inserted from $C_{alt1500}$ onwards and not from $C_{alt1500}$, thereby avoiding the aircraft making an unnecessary loop (flying back over points that have already been overflown) or pilot intervention:
Part of Tins to be inserted: $C_{alt1500}/M$ $Pm=B/C_{alt1500}/D/E/C_{alt150}/M$.

Accounting for the current position of the aircraft between E and C, the fraction of Pm still to be flown Fmv is equal to:

$Fmv=C_{alt150}/M$.

An optimal insertion of Tins in Pini makes it possible to obtain an adequate modified flight plan and also avoids the pilot having to intervene to delete duplicates. In addition, the resultant trajectory corresponds to what air traffic control is expecting.

For preference, the iterative calculation stops as soon as an occurrence that has an identical type and identical attributes has been identified. No unnecessary calculation is performed because the relevant occurrence is identified as quickly as possible, thereby optimizing calculation time.

According to one preferred mode, a set of 19 types of leg from the ARINC aeronautical standard is considered:
IF: Initial fix, fixed point on the ground;
CF: Course to a fix;
DF: Direct to a fix;
TF: Track to a fix following a great circle between 2 fixes;
AF: Arc to a fix about a DME beacon;
RF: Radius to a fix between 2 fixes;
FA: Fix to an altitude—following a course from a fix to a specified altitude;
FM: Fix to a manual termination from a fixed point until manually terminated;
CA: Course to an altitude following a course to a specified altitude;
CD: Course to a specified DME distance;
CR: Course to a radial termination;
VA: Heading to a specified altitude;
VD: Heading to a DME distance termination;
VM: Heading to a manual termination;
VR: Heading to a radial termination;
PI: Procedure turn outbound from a fix then making a one hundred and eighty-degree turn;
HA: Racetrack course with hold to an altitude;
HF: Racetrack course with a single turn holding to a fix;
HM: Racetrack with manual termination;

Alternatively, the set is made up of the 23 types from the ARINC standard, namely types FC, FD, CI and VI in addition to the 19 above.

According to a preferred embodiment, the subset SEF of fixed leg types is made up of 16 types: IF, CF, DF, TF, AF, RF, FA, FM, CD, CR, VD, VR, PI, HA, HF and HM.

According to a preferred embodiment, the attribute or attributes are chosen from a list comprising: a turn direction TD, a heading Course, an altitude Alt, a distance di, a radial R, a maximum excursion in terms of time tex or in terms of distance, dex.

For preference, the list also comprises an attribute relating to the stringing sequence when the set comprises the aforementioned 19 legs (see table 1).

Figure 7:
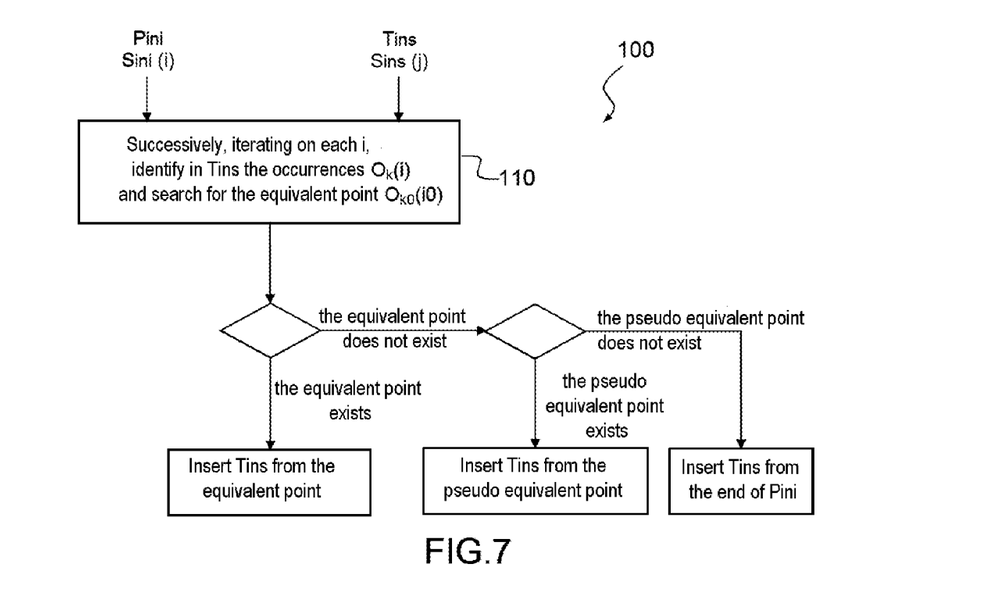
FIG. 7 illustrates a first embodiment of the method according to the invention.

According to a first embodiment illustrated in FIG. 7, when the pseudo point does not exist, the segment that is to be inserted Tins is inserted into the initial flight plan Pini after the last initial leg Sini(n), and from the first leg Tins(1) to the last Tins(m), namely in its entirety.

Figure 8:
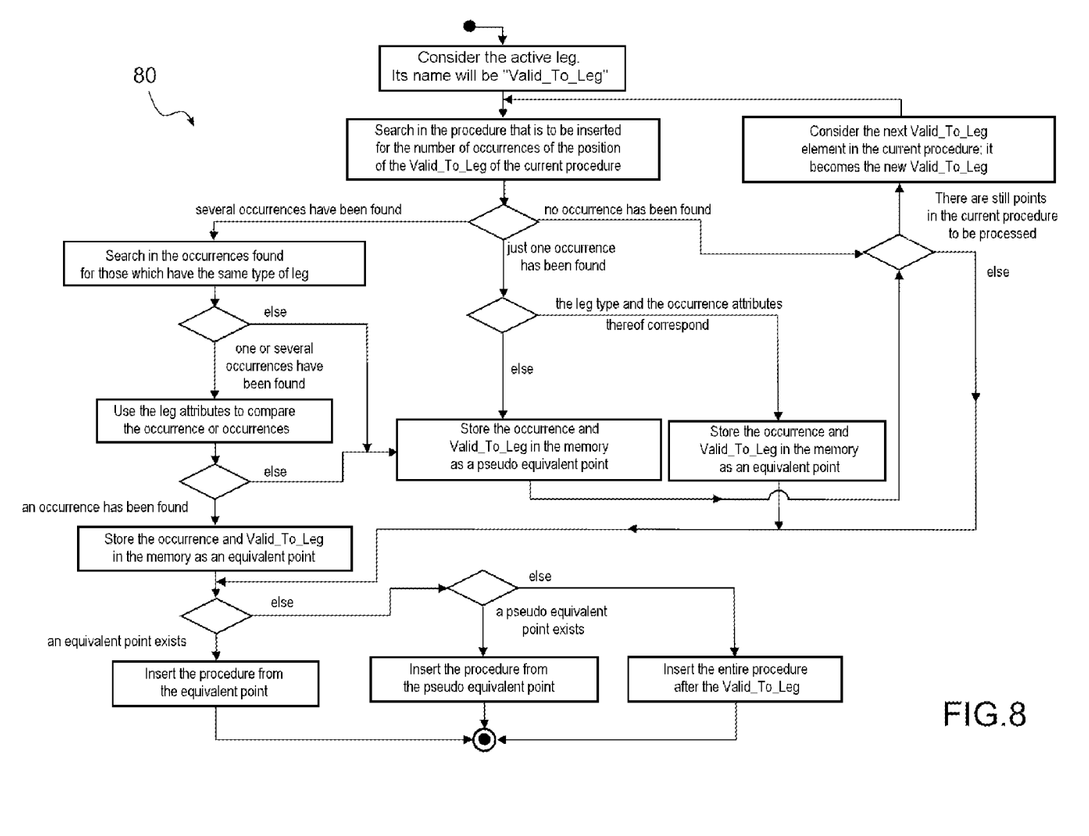
FIG. 8 describes one example of an algorithm for implementing the invention according to the first embodiment.

FIG. 8 describes one example of a flow diagram of the implementation of the invention, according to the first embodiment of the invention.

In the algorithm 80 of FIG. 8, the initial flight plan Pini is referred to as the current procedure, and the segment that is to be inserted Tins is referred to as the procedure to be inserted.

The fixed initial leg of current Pini-Sini(i)—loaded for the iterative calculation is initialized with the active leg, which is the first leg ahead of the aircraft. The current leg is referred to as "Valid_to_Leg".

The algorithm 80 is split into three branches, no occurrence, one occurrence and more than one occurrence. The pseudo point is stored in memory during the iterative calculation and as soon as an equivalent point is identified the procedure Tins is inserted from this point. If during the course of iteration over the set of legs of Pini, no equivalent point is identified, the procedure Tins is inserted from the pseudo equivalent point stored in memory, if there is such a point.

Figure 9:
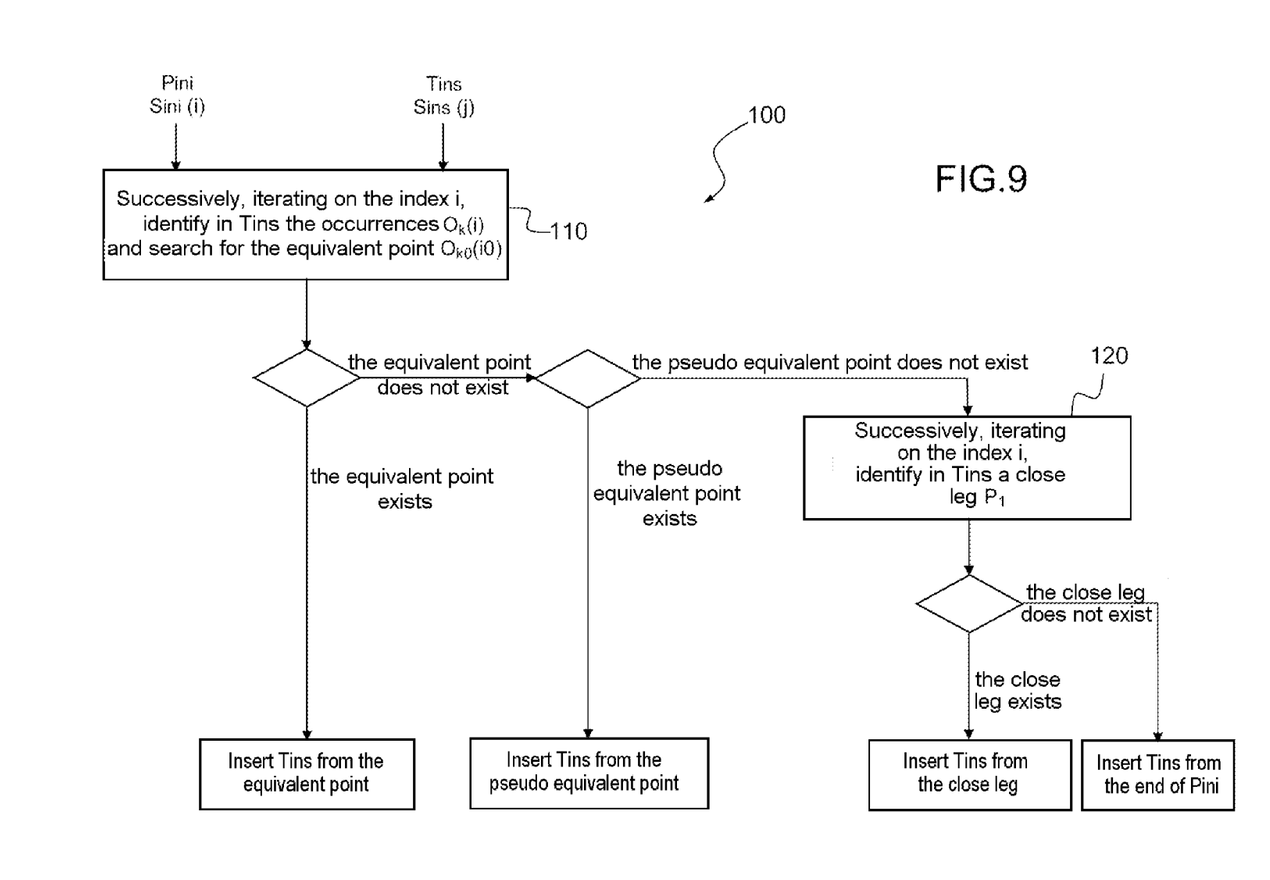
FIG. 9 illustrates a second embodiment of the method according to the invention.

According to a second embodiment illustrated in FIG. 9, the method 100 according to the invention further comprises, when the pseudo equivalent point does not exist, the step 120 which consists in identifying, through a second iterative calculation on the index i, in the segment that is to be inserted Tins, a fixed leg to be inserted of lower index $i_2$, and lowest rank k2, P having a position $WPT_P$ situated a distance d away from the position $WPT_{(i2)}$ of the leg of index $i_2-S_{ini}(i_2)$—that is less than a predefined distance Dist. This leg P identified is referred to as close leg.

If a close leg P exists, the FMS inserts the segment that is to be inserted Tins from the close leg.

If the close leg P does not exist, the FMS inserts the segment that is to be inserted Tins into the initial flight plan Pini after the last initial leg.

For preference, the second iterative calculation stops as soon as the close leg P is identified, in order to save on calculation time.

Typically Dist=50 m, 100 m, 250 m, or 500 m or 1000 m, or 2000 m.

In this embodiment, in the case where no occurrence has been identified (no pseudo equivalent point), the calculation is repeated for each fixed leg of Pini, looking for the leg of Tins of lowest order the associated position of which is close to the position associated with the leg of Pini considered. The leg of Tins of lowest order situated near to one of the legs of Pini is thus identified.

Figure 10:
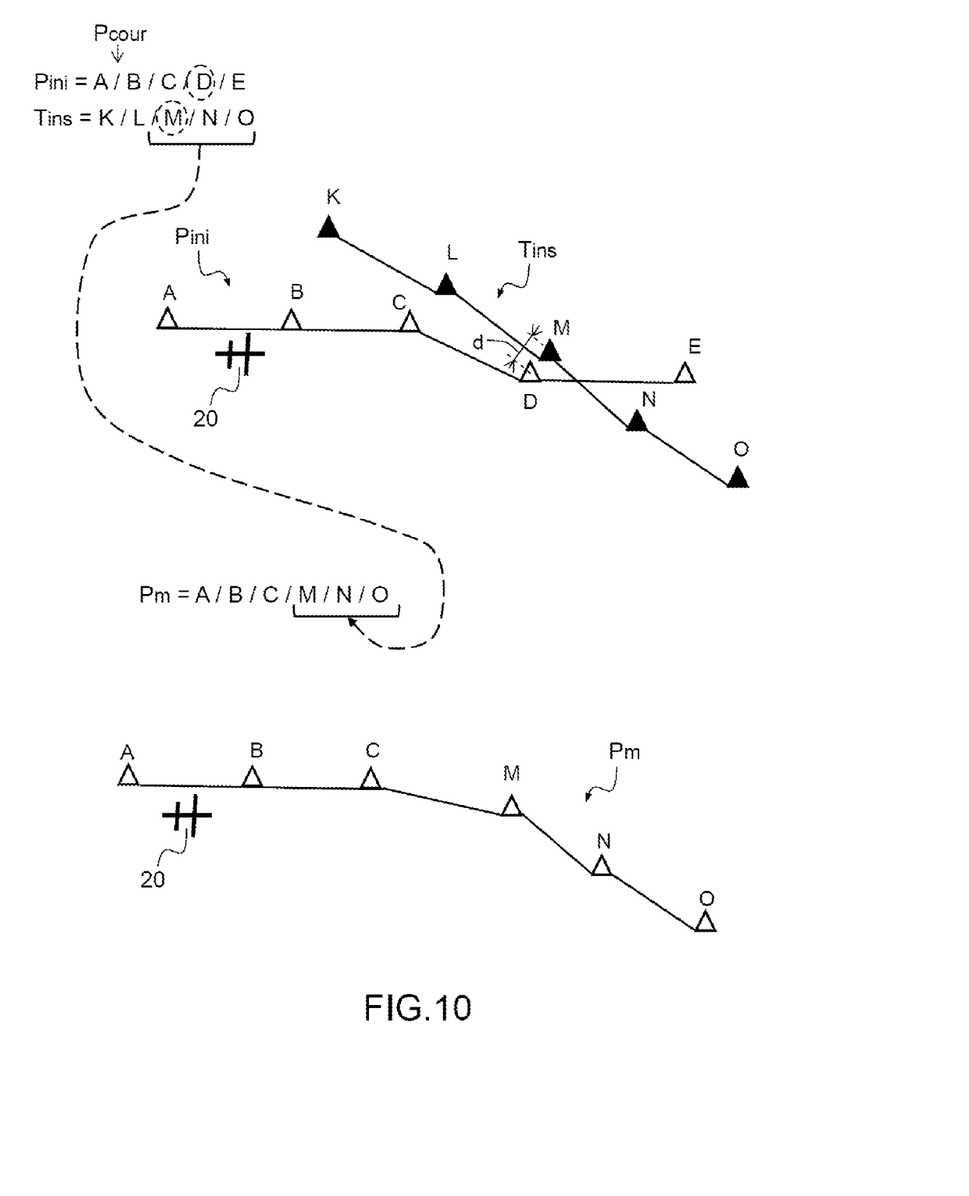
FIG. 10 illustrates one advantage of the second embodiment of the method according to the invention.

The advantage with this second alternative form is illustrated in FIG. 10 which reconsiders the case of FIGS. 4a-4b.

The desire is to insert the segment Tins=K/L/M/N/O into a flight plan Pini=A/B/C/D/E (see FIG. 4a).

The position $WPT_M$ associated with M is not identical to the position $WPT_D$ associated with D, but is close, for example $WPT_M$ is situated at a distance d less than 1 km away from $WPT_D$.

For a predefined distance Dist equal to 1 km, the point M satisfies the proximity condition, M is the close leg and Tins is inserted from M.

Fraction of Tins inserted: M/N/O, M replacing D in Pini:

$Pm=A/B/C/M/N/O$

Accounting for the current position of the aircraft 20 between A and B, the fraction of Pm still to be flown is: B/C/M/N/O One advantage with this alternative form is that it avoids flying unnecessary points or manual intervention on the part of the pilot in order to delete them.

This alternative form is preferably implemented during the cruising phase of the aircraft, on routes for which the aircraft position to within the distance Dist is non-critical.

Operationally, if an airway (highway in the sky) made up of a list of fixes is modified or inserted during cruising flight, crossing points between airways, which are close to one another but noncoincident, may exist. Likewise, for a maritime patrol manoeuvre following mobile points (sonar buoys for example), the mission computer sends the FMS the procedure with the names of points corresponding to the position of the buoys. If the system wishes to modify the search procedure, new points are transmitted, corresponding to the new positions of buoys (which can move on the sea). A comparison of distances then becomes highly beneficial in order to allow the new list of legs to be incorporated efficiently into the existing flight plan as the points will have moved by only a few tens of metres.

This alternative form needs to be adjusted in the terminal procedures when the aircraft is approaching the aircraft because the space is generally cluttered with other aircraft and the demands on the positional accuracy of the aircraft are more strict. The choice of distance value is therefore dependent on the zone in which the aircraft is operating (unless it is zero in zones in which position and trajectory are very tightly controlled, such as RNP AR approaches).

Another aspect of the invention relates to a device for inserting a segment Tins of flight plan into an initial flight plan Pini of an aircraft, the device being configured to implement the steps of the method according to the invention. Another aspect of the invention is a flight management system FMS comprising the device according to the invention.

A final aspect of the invention relates to a computer program product, the said computer program comprising code instructions to run the steps of the method according to the invention.

TABLE 1

Tables of comparison attributes by leg type.

| Type of leg | WP attribute | Turn direction attribute (left or right) | Heading attribute | Attributes-other | Leg combining attribute | English-language definition of the leg |
|---|---|---|---|---|---|---|
| IF | Fix | | | | | Initial fix |
| TF | Fix | Turn_direction | | | | Track to a fix |
| CF | Fix | Turn_direction | Course | | | Course to a fix |
| DF | Fix | Turn_direction | | | | Direct to a fix |
| FA | Fix | Turn_direction | Course | Altitude (target altitude) | | Fix to an altitude |
| FM | Fix | Turn_direction | Course | | | From a fix to a manual termination |
| CA | | Turn_direction | Course | Altitude (target altitude) | | Course to an altitude |

TABLE 1-continued

Tables of comparison attributes by leg type.

| Type of leg | WP attribute | Turn direction attribute (left or right) | Heading attribute | Attributes-other | Leg combining attribute | English-language definition of the leg |
|---|---|---|---|---|---|---|
| CD | Fix | Turn_direction | Course | Distance (target distance of the fix) | Is_CI_VI | Course to a DME distance |
| CR | Fix | Turn_direction | Course | Radial (target radial of the fix) | Is_CI_VI | Course to a radial termination |
| RF | Fix (*2) | Turn_direction | | | | Constant radius arc |
| AF | Fix (*2) | Turn_direction | | | | Arc to a fix |
| VA | | Turn_direction | Course | Altitude (target altitude) | | Heading to an altitude termination |
| VD | Fix | Turn_direction | Course | Distance (target distance of the fix) | Is_CI_VI | Heading to a DME distance termination |
| VM | | Turn_direction | Course | | | Heading to a manual termination |
| VR | Fix | Turn_direction | Course | Radial (target radial of the fix) | Is_CI_VI | Heading to a radial termination |
| PI | Fix | Turn_direction | Course | Max_excursion (maximum time or distance for making the one eighty turn) | | 045/180 procedure turn |
| HA | Fix | Turn_direction | Course | Altitude (target altitude)-distance (of hold) | | Holding in lieu of Procedure Turn (Altitude termination) |
| HF | Fix (*2) | Turn_direction | Course | Distance (distance of hold) | | Holding in lieu of Procedure Turn (Single circuit terminating at the fix) |
| HM | Fix | Turn_direction | Course | Distance (distance of hold) | | Holding in lieu of Procedure Turn (Manual termination) |

The invention claimed is:

1. A method for inserting a segment (Tins) of flight plan into an initial flight plan (Pini) of an aircraft, performed by a flight management system (FMS) of said aircraft, the initial flight plan (Pini) comprising an ordered series of initial legs (Sini), the segment to be inserted (Tins) comprising an ordered series of legs to be inserted (Sins), a leg corresponding to an instruction for calculating an elementary trajectory and being defined by an aeronautical standard that defines a set of leg types, each type being characterized by at least one attribute corresponding to a type of data item needed for calculating the said elementary trajectory, a subset of the said set of types having an attribute (Fix) corresponding to a position (WPT) defined by geographical latitude and longitudinal coordinates, a leg the type of which belongs to the said subset being referred to as a fixed leg and having an associated position, the said initial fixed legs being indexed by an index i that varies from 1 to n, the method comprising the steps involving:

identifying, using a first iterative calculation on the index i, in the segment to be inserted (Tins), the fixed legs to be inserted that have a position identical to the position of the leg of index i Sini(i)), the said legs thus determined being referred to as occurrences of the leg of index i, the said occurrences (O1, O2) being ordered by rank k varying from 1 to m, as a function of their position in the segment that is to be inserted (Tins), and searching, among the identified occurrences, for the occurrence of lower index i and lowest rank k ($O_{i0}(k_0)$) that has a type and attribute values identical to the segment of index i, referred to as equivalent point, when the said equivalent point exists, inserting the segment that is to be inserted (Tins) from the said equivalent point, otherwise, inserting the segment that is to be inserted (Tins) from the identified occurrence of lower index i and lowest rank k ($O_{i1}(k_1)$) referred to as a pseudo equivalent point, when the said pseudo equivalent point exists.

2. The method according to claim 1, in which the said first iterative calculation stops as soon as the said equivalent point is identified.

3. The method according to claim 1, in which the said pseudo equivalent point and the associated fixed initial leg are stored in memory while the first iterative calculation is being run.

4. The method according to claim 1, in which the aeronautical standard is the standard ARINC 424.

5. The method according to claim 4 in which the said set of types comprises 19 types of leg:

initial fix (IF) fixed on the ground; course to a fix (CF); direct to a fix (DF); track to a fix (TF) between two fixes on a great circle; arc to a fix (AF) about a DME beacon; radius to a fix (RF) in a constant-radius turn between two fixes; fix to an altitude (FA) following a course from a fix to a specified altitude; fix to a manual termination (FM) from a fixed point until manually terminated; course to an altitude (CA) following a course to a specified altitude; course to a specified DME distance (CD); course to a radial termination (CR); heading to a specified altitude (VA); heading to a DME distance termination (VD); heading to a manual termination (VM); heading to a radial termination (VR); procedure turn (PI) following a course starting from a fix then making a one hundred and eighty degree turn; racetrack course with hold to an altitude (HA); racetrack course with a single turn holding to a fix (HF); manual racetrack course holding to a manual termination (HM).

6. The method according to claim 5, in which the said subset of types comprises 16 types of fixed leg:

initial fix (IF) fixed on the ground; course to a fix (CF); direct to a fix (DF); track to a fix (TF) between two fixes on a great circle; arc to a fix (AF) about a DME beacon; radius to a fix (RF) in a constant-radius turn between two fixes; fix to an altitude (FA) following a course from a fix to a specified altitude; fix to a manual termination (FM) from a fixed point until manually terminated; course to a specified DME distance (CD); course to a radial termination (CR); heading to a DME distance termination (VD); heading to a radial termination (VR); procedure turn (PI) following a course starting from a fix then making a one hundred and eighty degree turn; racetrack course with hold to an altitude (HA); racetrack course with a single turn holding to a fix (HF); manual racetrack course holding to a manual termination (HM).

7. The method according to claim 1, in which one or more attribute(s) are chosen from a list comprising: a turn direction (TD), a heading (course), an altitude (Alt), a distance (di), a radial (R), a maximum excursion in terms of time or in terms of distance (tex, dex).

8. The method according to claim 1, in which when the pseudo equivalent point does not exist, the segment to be inserted (Tins) is inserted in the initial flight plan (Pini) after the last initial leg.

9. The method according to claim 1 further comprising, when the pseudo equivalent point does not exist, a step consisting in:

identifying using a second iterative calculation on the index i, in the segment that is to be inserted (Tins), a fixed leg that is to be inserted that is of lower index i and lowest rank k (P1) having a position (WPT1) situated at a distance (d) from the position ($WPT_{(i2)}$) of the leg of index i ($S_{ini}(i_2)$) that is less than a predefined distance (Dist) and referred to as a close leg, if the said close leg exists, inserting the segment that is to be inserted (Tins) from the close leg, if the close leg does not exist, inserting the segment that is to be inserted (Tins) in the initial flight plan (Pini) after the last initial leg.

10. A device for inserting a segment (Tins) of flight plan in an initial flight plan (Pini) of an aircraft, the device being configured to perform the steps of the method according to claim 1.

11. The flight management system (FMS) comprising the device according to claim 10.

12. A non-transitory computer readable storage medium having code instructions stored therein, that, when executed by a computer, carry out the method according to claim 1.

* * * * *